(12) United States Patent
Zhan et al.

(10) Patent No.: US 9,474,143 B2
(45) Date of Patent: Oct. 18, 2016

(54) SYSTEMS AND METHODS FOR GENERATING COMPLEX VECTORIAL OPTICAL FIELDS

(71) Applicant: University of Dayton, Dayton, OH (US)

(72) Inventors: Qiwen Zhan, Centerville, OH (US); Wei Han, Kettering, OH (US); Wen Cheng, Kettering, OH (US)

(73) Assignee: University of Dayton, Dayton, OH (US)

( * ) Notice: Subject to any disclaimer, the term of this patent is extended or adjusted under 35 U.S.C. 154(b) by 0 days.

(21) Appl. No.: 14/742,362

(22) Filed: Jun. 17, 2015

(65) Prior Publication Data
US 2016/0055929 A1 Feb. 25, 2016

Related U.S. Application Data

(60) Provisional application No. 62/039,159, filed on Aug. 19, 2014.

(51) Int. Cl.
| | |
|---|---|
| *G21K 1/00* | (2006.01) |
| *H05H 3/04* | (2006.01) |
| *G02B 26/02* | (2006.01) |
| *G02B 26/06* | (2006.01) |
| *G02B 5/32* | (2006.01) |
| *G02B 27/28* | (2006.01) |
| *G02B 26/00* | (2006.01) |
| *G03H 1/02* | (2006.01) |

(52) U.S. Cl.
CPC ........... *H05H 3/04* (2013.01); *G02B 26/02* (2013.01); *G02B 26/06* (2013.01); *G02B 27/28* (2013.01); *G21K 1/006* (2013.01); *G02B 5/32* (2013.01); *G02B 26/00* (2013.01); *G02B 27/286* (2013.01); *G03H 2001/0224* (2013.01); *G03H 2225/30* (2013.01); *G03H 2225/60* (2013.01)

(58) Field of Classification Search
CPC ............... G21K 1/0006; H05H 3/04; G03H 2001/0224; G03H 2225/30; G03H 2225/33; G03H 2225/60; G02B 5/32; G02B 27/286; G02B 26/02; G02B 26/08
See application file for complete search history.

(56) References Cited

U.S. PATENT DOCUMENTS

| | | | |
|---|---|---|---|
| 2008/0212980 A1* | 9/2008 | Weiner ............... | H04B 10/2569 398/184 |
| 2009/0185141 A1* | 7/2009 | Chen ..................... | G02B 27/48 353/38 |

OTHER PUBLICATIONS

Moreno, I., et al., "Complete polarization control of light from a liquid crystal spatial light modulator," vol. 20, No. 1, 364-376, Dec. 21, 2011.*
Han, W., et al., "Vectorial optical field generator for the creation of arbitrarily complex fields," Optics Express vol. 21, No. 18, 20692-20706, Aug. 27, 2013.*
Moreno, I., et al., "Complete polarization control of light from a liquid crystal spatial light modulator," Optics Express vol. 20, No. 1, 364-376, Dec. 21, 2011.*

(Continued)

*Primary Examiner* — Wyatt Stoffa
(74) *Attorney, Agent, or Firm* — Dinsmore & Shohl

(57) ABSTRACT

A vectorial optical field generator includes a radiation source a modulator surface, a first quarter wave plate, a second quarter wave plate, and an output plane. The radiation source emits an input radiation along a path and the modulator surface is positioned along the path and configured to modulate a phase, an amplitude, a polarization ratio, and a retardation of the input radiation along a fourth area of the modulator surface. The output plane is positioned along the path and receives output radiation resulting from modulating the input radiation with the modulator surface, the first quarter wave plate, and the second quarter wave plate.

20 Claims, 19 Drawing Sheets

(56) References Cited

OTHER PUBLICATIONS

Tripathi, S., et al., "Versatile generation of optical vector fields and vector beams using a non-interferometric approach," Optics Express vol. 20, No. 9, 10788-10795, Apr. 23, 2012.*

Kenny et al., "Complete polarization and phase control for focus-shaping in high-NA microscopy", Optics Express, vol. 20, No. 13, pp. 14015-14029, Jun. 18, 2012.
Han et al., "Vectorial optical field generator for the creation of arbitrarily complex fields", Optics Express, vol. 21, No. 18, pp. 20692-20706, Sep. 9, 2013.

* cited by examiner

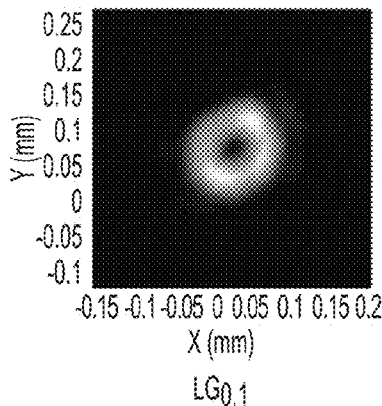 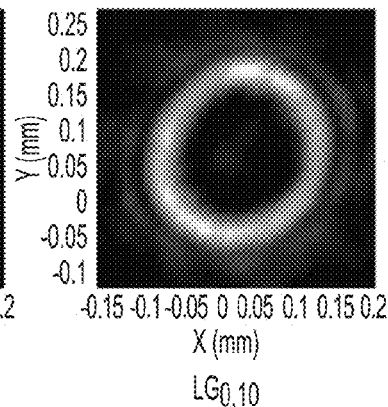 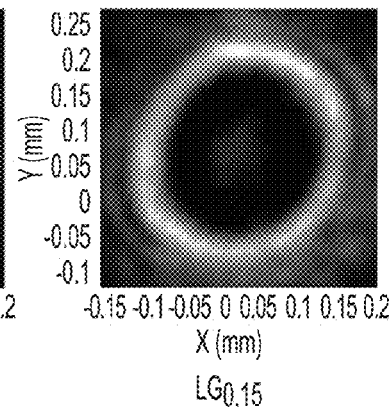
FIG. 6A      FIG. 6B      FIG. 6C
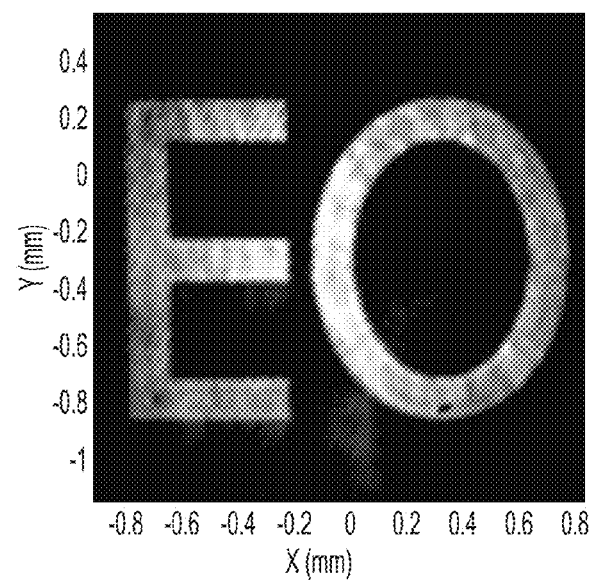
FIG. 7

SYSTEMS AND METHODS FOR GENERATING COMPLEX VECTORIAL OPTICAL FIELDS

CROSS REFERENCE TO RELATED APPLICATIONS

The present application hereby claims the benefit of Provisional U.S. Application No. 62/039,159 filed Aug. 19, 2014 and titled "Systems and Methods for Generating Arbitrary Complex Vectorial Optical Fields."

TECHNICAL FIELD

The present specification generally relates to systems and methods for generating complex optical fields and, more specifically, systems and methods for modulating the phase, amplitude, polarization rotation, and retardation of optical fields with a modulator surface.

BACKGROUND

Optical trapping and manipulation of particles in colloidal and biomedical sciences are made possible by the shaping of light. Shaped optical fields have enabled researchers to better understand the biophysics and colloidal dynamics through the trapping, guiding or patterning of molecules or nano/micro particles. Spatial engineering of focal field intensity has been studied to reach resolution far beyond diffraction limit in microscope system. Vortex beam, also known as "twisted light", has also drawn interest owing to its spiral phase wavefront carrying orbital angular momentums. Better integrity of vortex beam through propagation in turbulent atmosphere may use orbital angular momentum as an information carrier for free space communication due to its orthogonality and multiplexing capability. Besides the manipulation of intensity and phase, as the vector nature of electromagnetic wave, the state of polarization (SOP) also plays an important role in flat top generation, focus engineering, optical tweezing and surface plasmon sensing using cylindrical vectorial beams, and spatially resolved ellipsometry. All the above applications require the spatial modulations of certain aspect of optical fields.

Versatile systems have been developed for the generation of optical fields with exotic properties. However, all existing techniques have limitations and cannot be used to generate a spatially-variant complex vectorial optical field with high spatial resolution on a pixel-by-pixel basis. Therefore, a need exists to generate a spatially-variant complex vectorial optical field with high spatial resolution on a pixel-by-pixel basis.

SUMMARY

In one embodiment, a vectorial optical field generator may include a radiation source, a modulator surface, a first quarter wave plate, a second quarter wave plate, and an output plane. The radiation source emits an input radiation along a path and the modulator surface is positioned along the path. The light modulator is configured to modulate a phase of the input radiation on a first area of the modulator surface, an amplitude of the input radiation on a second area of the modulator surface, a polarization ratio of the input radiation on a third area of the modulator surface, and a retardation of the input radiation along a fourth area of the modulator surface. The first quarter wave plate is positioned along the path such that the input radiation travels through the first quarter wave plate, reflects off of the second area of the modulator surface, and back through the first quarter wave plate. The second quarter wave plate is positioned along the path such that the input radiation travels through the second quarter wave plate, reflects off of the third area of the modulator surface, and back through the second quarter wave plate. The output plane is positioned along the path and receives output radiation resulting from modulating the input radiation with the modulator surface, the first quarter wave plate, and the second quarter wave plate.

In one embodiment, a method for generating complex vectorial optical field on a pixel by pixel basis, may include: emitting an input radiation along a path; displaying an image on a modulator surface; positioning the modulator surface along the path; modulating: a phase of the input radiation on a first area of the modulator surface, an amplitude of the input radiation on a second area of the modulator surface, a polarization ratio of the input radiation on a third area of the modulator surface, and a retardation of the input radiation on a fourth area of the modulator surface; rotating a polarization axis of the input radiation with a first quarter wave plate positioned along the path such that the input radiation travels through the first quarter wave plate, reflects off of the second area, and back through the first quarter wave plate; rotating the polarization axis of the input radiation with a second quarter wave plate positioned along the path such that the input radiation travels through the second quarter wave plate, reflects off of the third area, and travels back through the second quarter wave plate; and receiving an output radiation with a complex vectorial optical field on an output plane resulting from modulating the input radiation with the modulator surface, the first quarter wave plate, and the second quarter wave plate.

In one embodiment, a vectorial optical field generation system may include a radiation source, a first light modulator, a second light modulator, a first quarter wave plate, a second quarter wave plate, an output plane, and a controller. The radiation source emits an input radiation along a path. The first light modulator and the second light modulator are both reflective, phase-only, liquid crystal spatial light modulators. The first light modulator positioned along the path may include: a phase of the input radiation on a first area of the first light modulator, and an amplitude of the input radiation on a second area of the first light modulator and the second light modulator positioned along the path comprises: a polarization ratio of the input radiation on a third area of the second light modulator, and a retardation of the input radiation along a fourth area of the second light modulator. The first quarter wave plate is positioned along the path such that the input radiation travels through the first quarter wave plate, reflects off of the second area of the first light modulator and back through the first quarter wave plate. The second quarter wave plate is positioned along the path such that the input radiation travels through the second quarter wave plate, reflects off of the third area of the second light modulator, and back through the second quarter wave plate. The output plane is positioned along the path and receives output radiation resulting from modulating the input radiation with the first light modulator, the second light modulator, the first quarter wave plate, and the second quarter wave plate. The controller is configured to control the first light modulator and the second light modulator, wherein: the controller retrieves from memory an image comprising one or more phase patterns required to generate the output radiation with a complex vectorial optical field, the one or more phase patterns may include a first phase pattern and a second phase pattern; the first phase pattern comprises a phase reflection corresponding to the first area and an amplitude reflection corresponding to the second area; the second phase pattern comprises a polarization ratio reflection corresponding to the third area and a retardation reflection corresponding to the fourth area; the controller loads the first phase pattern onto the first light modulator; and the controller loads the second phase pattern onto the second light modulator.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and not intended to limit the subject matter defined by the claims. The following detailed description of the illustrative embodiments can be understood when read in conjunction with the following drawings, where like structure is indicated with like reference numerals and in which:

FIG. 6A are images of phase modulation with spiral phase of topological charge 1 using the vectorial optical field generator system according to one or more embodiments shown and described herein;

FIG. 6B is an image of phase modulation with spiral phase of topological charge 10 using the vectorial optical field generator system according to one or more embodiments shown and described herein;

FIG. 6C is an image of phase modulation with spiral phase of topological charge 15 using the vectorial optical field generator system according to one or more embodiments shown and described herein;

FIG. 7 is an x-polarized logo illustrating amplitude modulation using the vectorial optical field generator system according to one or more embodiments shown and described herein;

DETAILED DESCRIPTION

This disclosure describes the design and implementation of a versatile optical system that is capable of generating complex optical fields by spatially modulating all aspects of optical field (including phase, amplitude, polarization ratio and retardation) on a pixel-by-pixel basis. Various complex vectorial optical fields have been successfully generated and tested to demonstrate the functionality and flexibility of the system. The complex vectorial optical field generation system described herein is capable of tailoring all the spatial aspects of optical fields with high spatial resolution. Laser beams with these complex optical fields may find broad applications including, but not limited to, optical microscopy, lithography, laser material processing, and optical tweezers.

Vectorial optical fields can be represented as a superposition of two orthogonal polarization components. Using Jones vector representation, the desired field can be written as:

$$E_d(x, y) = A_d(x, y)e^{j\phi_d(x,y)}\begin{pmatrix} E_{xd}(x, y) \\ E_{yd}(x, y)e^{j\delta_d(x,y)} \end{pmatrix}, \quad (1)$$

where $A_d(x, y)$ represents the amplitude distribution, $\phi_d(x, y)$ is the common phase for both the x and y components, and the normalized Jones vector contains the polarization information where $E_{xd}$ and $E_{yd}$ are both real and normalized ($E_{xd}^2 + E_{yd}^2 = 1$). The $\delta_d(x, y)$ is the desired phase retardation between the x and y components. Four degrees of freedom, namely the phase, amplitude, polarization ratio, and retardation between the x and y components are necessary to fully characterize a vectorial optical field. All four of these degrees of freedom should be controlled on a pixel-by-pixel basis for the generation of complex optical fields.

Figure 1:
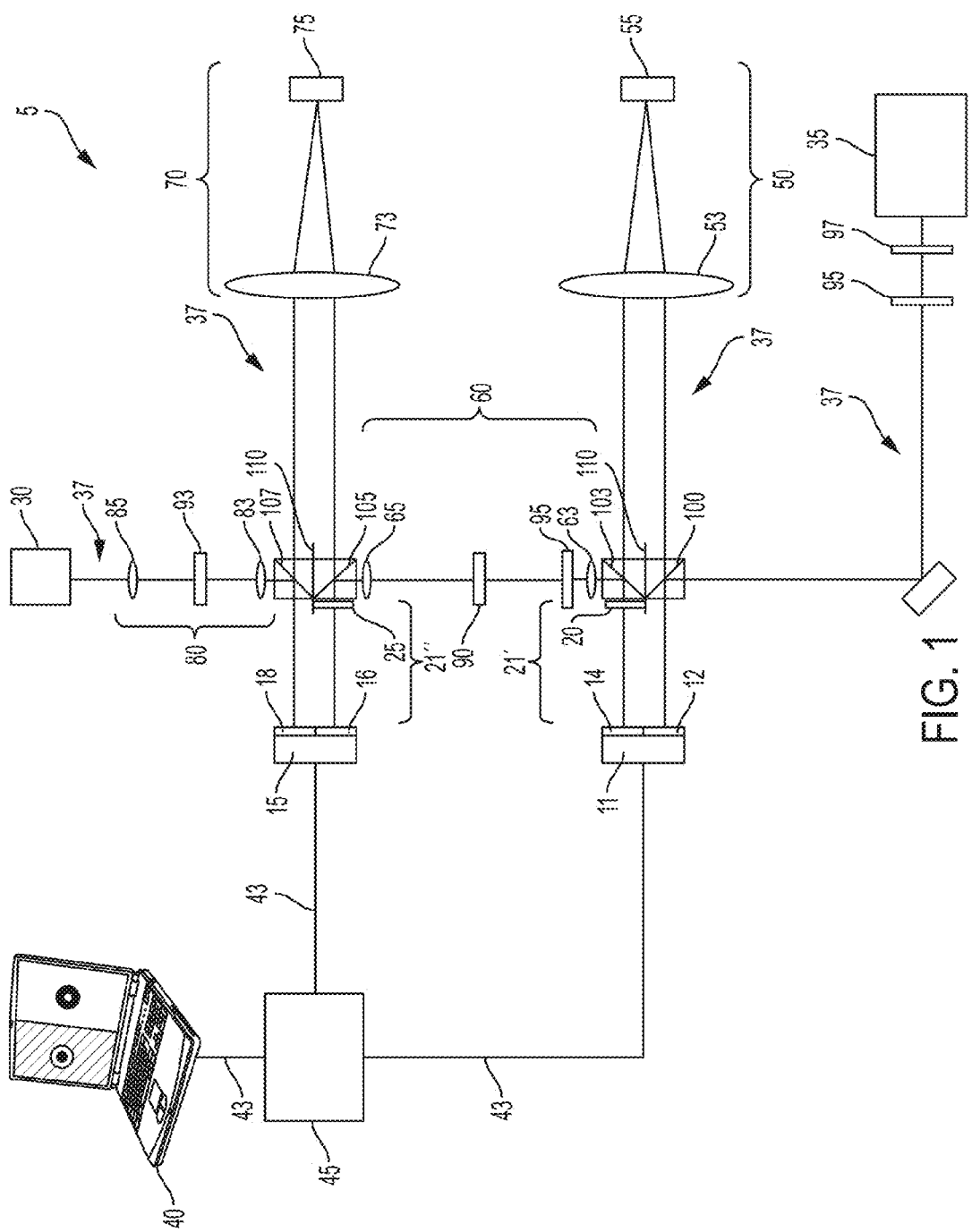
FIG. 1 is a schematic illustration of a vectorial optical field generator according to one or more embodiments shown and described herein.

FIG. 1 is a schematic illustration a vectorial optical field generator 5 comprising a radiation source 35, a first light modulator 11, a second light modulator 15, one or more polarization rotators 21, and an output plane 30. The radiation source 35 emits an input radiation along a path 37. The first light modulator 11 and the second light modulator 15 are positioned along the path 37 and are configured to modulate a phase, an amplitude, a polarization ratio, and a retardation of the input radiation. The first light modulator 11 comprises a first area 12 and a second area 14 and the second light modulator 15 comprises a third area 16 and a fourth area 18. The first area 12 is configured to modulate a phase of the input radiation, the second area 14 is configured to modulate an amplitude of the input radiation, the third area 16 is configured to modulate a polarization ratio of the input radiation, and the fourth area 18 is configured to modulate a retardation of the input radiation.

Figure 5:
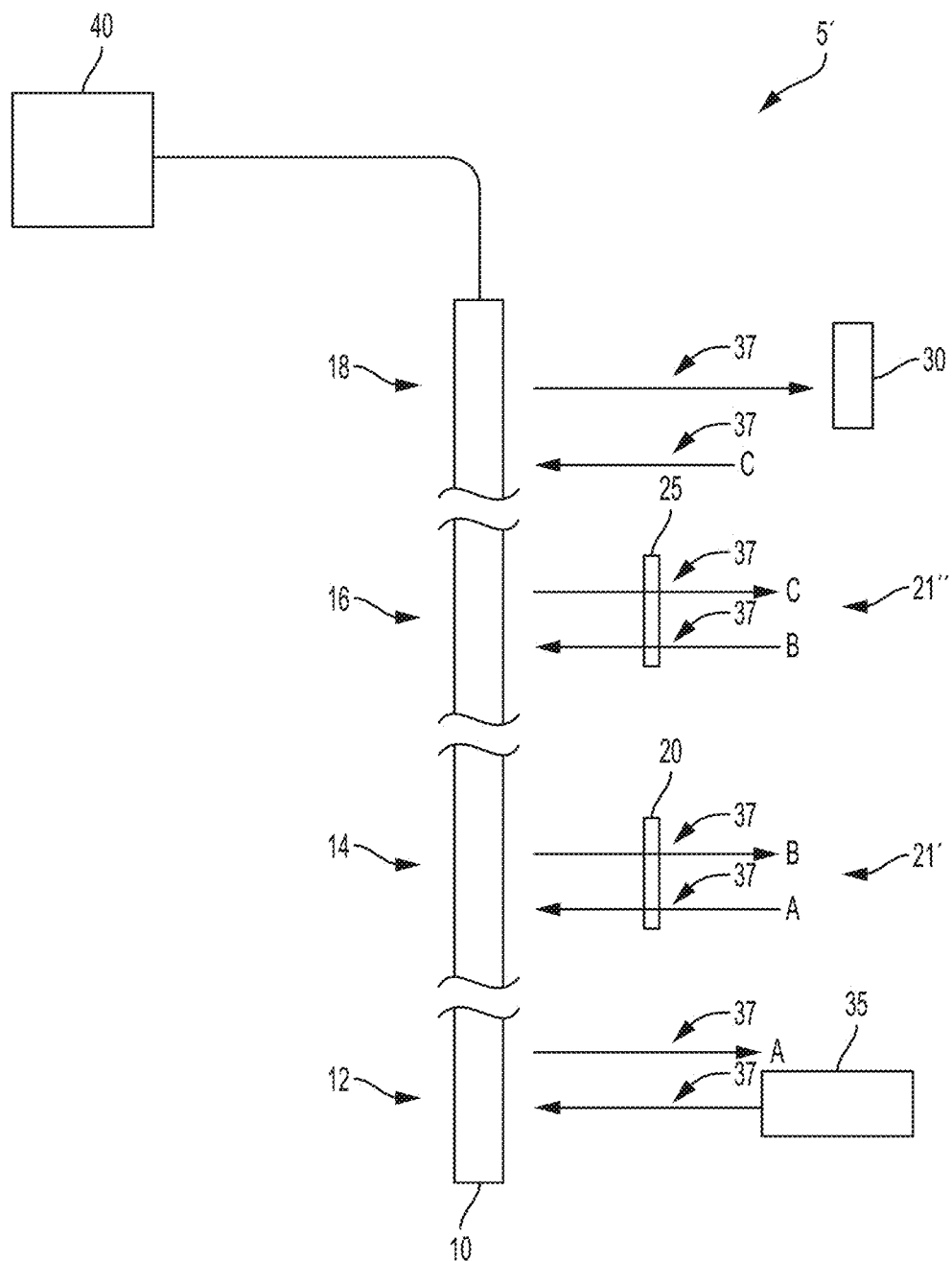
FIG. 5 is a schematic illustration of another embodiment of a vectorial optical field generator according to one or more embodiments shown and described herein.

In one embodiment, the first light modulator 11 and the second light modulator 15 may each be any spacial light modulator that is based on birefringence effect. In one embodiment, the first light modulator 11 and the second light modulator 15 may each be a reflective, phase-only, liquid crystal spatial light modulator (LC-SLM). Each LC-SLM may be a variable and addressable with a high definition resolution of about 1920×1080 with a pixel pitch of 8 µm and fill factor of 87%. The retardation for each pixel in each LC-SLM can be described as a function of the voltage (V) applied:

$$\delta(V) = (2\pi/\lambda)(n_e(V) - n_o)d, \quad (1)$$

where d is the thickness of the liquid crystal (LC) layer and $n_e$ and $n_o$ are the extraordinary and ordinary refractive indices of the LC retarder respectively. Due to the birefringent nature of the LC-SLM, the LC-SLM according to embodiments herein, only responds to the horizontal polarization parallel to the LC directors (i.e., along the long axis of the rod shaped liquid crystal molecules). In other words, the horizontal component (x-component) of the reflected input beam will carry the wavefront specified by the LC-SLM while the vertical one (y-component) will be simply reflected unaffected. Because four degrees of freedom in Equation 1 need to be independently controlled in the vectorial optical field generator system 5, four reflections are required where each LC-SLM section is loaded with one of the phase patterns for the modulations of phase, amplitude, polarization ratio and retardation. The four required reflections are generated in each area of the modulator surface, the third area 16, and the fourth area 18. An example of the LC-SLM is the Holoeye HEO 1080P. The "modulator surface" may refer to either the first area 12 and the second area 14 as shown in FIG. 1 or the modulator surface 10 as shown in FIG. 5.

Figure 2:
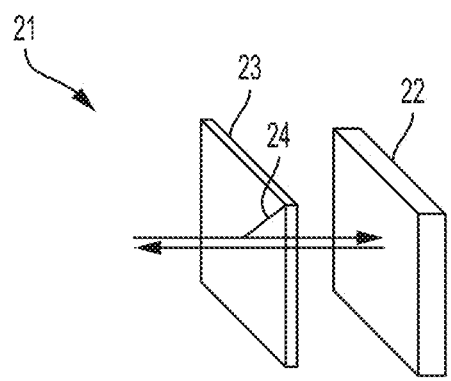
FIG. 2 illustrates an exemplary setup for a spatially variant polarization rotator according to one or more embodiments shown and described herein.
Figure 3:
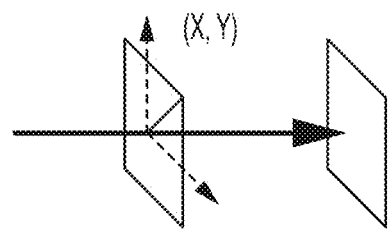
FIG. 3 illustrates an effective rotation of a fast axis if a quarter wave plate for an incident beam according to one or more embodiments shown and described herein.
Figure 4:
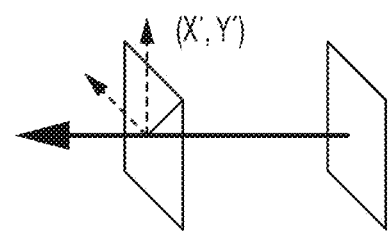
FIG. 4 illustrates an effective rotation of the fast axis of the quarter wave plate for a reflected beam according to one or more embodiments shown and described herein.

Referring to FIGS. 2-4, the vectorial optical field generator 5 (FIG. 1) includes one or more polarization rotators 21. Each polarization rotator 21 is based on the concept of a pure polarization rotator in order to generate the amplitude modulation and linear polarization rotation. Each polarization rotator 21 is configured to achieve fast, non-mechanical polarization rotation and may comprise a quarter-wave plate (QWP), a variable optical retarder with fast axis at 45° and another QWP with its fast axis perpendicular to that of the first QWP. In some embodiments, the variable retarder may be replaced with the LC-SLM to realize spatially variant polarization rotation function on a pixel-by-pixel basis. Therefore, as shown in FIG. 2, the one or more polarization rotators 21 may comprise a QWP 23 (i.e., the first quarter wave plate 20 or the second quarter wave plate 25 of FIGS. 1 and 5) and the LC-SLM 22 (i.e., modulator surface).

The fast axis 24 of the QWP 23 is along 45° with respect to the horizontal axis. The incident light passes through the QWP 23 with fast axis oriented at 45° in the laboratory coordinate (x, y) (FIG. 3) and reflects off of the LC-SLM 22 surface. The reflected light goes through the same QWP 23 for the second time (FIG. 4). However, due to the opposite propagation direction, the new laboratory coordinate (x', y') is a mirror image of laboratory coordinate (x, y) about the y axis. Therefore, the fast axis 24 of the QWP 23 has been effectively rotated to 135° in the coordinate (x', y').

The Jones matrix representation of the polarization rotator 21 can be calculated by Equation (2):

$$M_{PR} = R\left(-\frac{3\pi}{4}\right) J_{QWP} R\left(\frac{3\pi}{4}\right) \begin{pmatrix} -1 & 0 \\ 0 & 1 \end{pmatrix} M_{SLM} R\left(-\frac{\pi}{4}\right) J_{QWP} R\left(\frac{\pi}{4}\right) \quad (2)$$

$$= \frac{1}{4}\begin{pmatrix} 1-j & -1-j \\ -1-j & 1-j \end{pmatrix}\begin{pmatrix} -1 & 0 \\ 0 & 1 \end{pmatrix}\begin{pmatrix} e^{i\delta(x,y)} & 0 \\ 0 & 1 \end{pmatrix}\begin{pmatrix} 1-j & 1+j \\ 1+j & 1-j \end{pmatrix}$$

$$= e^{j\frac{\delta(x,y)}{2}}\begin{pmatrix} -\sin\left(\frac{\delta(x,y)}{2}\right) & -\cos\left(\frac{\delta(x,y)}{2}\right) \\ \cos\left(\frac{\delta(x,y)}{2}\right) & -\sin\left(\frac{\delta(x,y)}{2}\right) \end{pmatrix}$$

$$= e^{j\left(\frac{\delta(x,y)}{2}\right)} R\left(\frac{3\pi}{2} - \frac{\delta(x,y)}{2}\right)$$

where $M_{refl}$ indicates the reflection off of the LC-SLM 22 surface and $M_{QWP\_135°}$ and $M_{QWP\_45°}$ are the Jones matrices of the quarter wave plates with fast axes oriented at 135° and 45° respectively. Equation (2) describes the Jones matrix of the polarization rotator (PR) in terms of a spatially variant rotation matrix R with an extra phase term arising from the geometric effect. It is important to note that the additional geometric phase term (i.e., $$\left(\text{i.e., } e^{j\left(\frac{\delta(x,y)}{2}\right)}\right)$$

needs to be compensated for in many applications. The rotation matrix R indicates an effective polarization rotation of $$\frac{\delta(x, y)}{2} + \frac{\pi}{2}$$

at each pixel. The polarization rotator setup is also used to calibrate the look up table (e.g., gamma curves for the LC-SLM) for every LC-SLM used in the vectorial optical field generator 5. By precisely measuring the amount of rotation based on the nulling effect with a linear analyzer for each gray level, the gamma curves may be calibrated so that the gray level and the actual phase imposed by the LC-SLM are precisely correlated.

The vectorial optical field generator 5 includes one or more polarization rotators. In the embodiment shown in FIG. 1, a first polarization rotator 21' includes a first quarter wave plate 20 positioned along the path 37 such that the input radiation travels through the first quarter wave plate 20, reflects off of the second area 14 and back through the first quarter wave plate 20. A second polarization rotator 21" includes a second quarter wave plate 25 positioned along the path 37 such that the input radiation travels through the second quarter wave plate 25, reflects off of the third area 16, and back through the second quarter wave plate 25.

The radiation source 35 may be a coherent radiation source such as a Helium-Neon laser for example. The input radiation may either x-rays, ultraviolet light, visible light, infrared light, or microwaves. For example, the radiation source 35 may be a He—Ne laser of 632.8 nm wavelength. The output plane 30 is positioned along the path 37 and receives output radiation resulting from modulating the input radiation with the modulator surface, the first polarization rotator 21', and the second polarization rotator 21". The output plane 30 may be a 2-dimensional array detector such as a CCD camera for example. A non-limiting example of the CCD camera embodiment is model number LBA-FW-SCOR by Spiricon.

The vectorial optical field generator 5 may also comprise one or more image relays. the one or more image relays may comprise a first image relay 50, a second image relay 60, a third image relay 70, and a fourth image relay 80. The one or image relays may be used to define the path 37 and relay the input radiation from one area of the modulator surface (i.e., first light modulator 11 and the second light modulator 15 of FIG. 1 or the modulator surface 10 of FIG. 5) to another or to the output plane 30. The first image relay 50 comprises a first lens 53 and a first mirror 55. The first image relay 50 is positioned along the path 37 between the first area 12 and the second area 14. The second image relay 60 comprises a second lens 63 and a third lens 65. The second image relay 60 is positioned along the path 37 between the second area 14 and the third area 16. The third image relay 70 comprises a fourth lens 73 and a second mirror 75. The third image relay 70 is positioned along the path 37 between the third area 16 and the fourth area 18. The fourth image relay 80 comprises a fifth lens 83 and a sixth lens 85. The fourth image relay 80 is positioned along the path 37 between the fourth area 18 and the output plane 30. In one embodiment, each image relay is a 4-f imaging system comprising one lens. In an alternate embodiment, each image relay is a 4-f imaging system comprising one lens and a mirror.

The vectorial optical field generator 5 may also include a first spatial filter 90, a second spatial filter 93, a polarizer 95, a half-wave plate 97, one or more beam splitters, one or more opaque obstructions 110, and one or more general mirrors. The first spatial filter 90 may be positioned along the path 37 between the second lens 63 and the third lens 65 and the second spatial filter 93 may be positioned along the path 37 between the fifth lens 83 and the sixth lens 85. The polarizer 95 and the half-wave plate 97 may be positioned along the path 37 between the radiation source 35 and the modulator surface. The one or more beam splitters may include a first beam splitter 100, a second beam splitter 103, a third beam splitter 105, and a fourth beam splitter 107. The first beam splitter 100 directs the path 37 towards the first area 12 and allows the reflected input radiation from the first area 12 to pass through it towards the first lens 53. The second beam splitter 103 allows the input radiation from the first lens 53 to pass through it and directs the reflected input radiation from the second area 14 towards the second lens 63. An opaque obstruction 110 is positioned between the first beam splitter 100 and the second beam splitter 103 to ensure that any splits in the path 37 that are not directed to the appropriate lens are blocked. The third beam splitter 105 directs the path 37 towards the third area 16 and allows the reflected input radiation from the third area 16 to pass through it towards the fourth lens 73. The fourth beam splitter 107 allows the input radiation from the fourth lens 73 to pass through it and directs the reflected input radiation from the fourth area 18 towards the output plane 30. An opaque obstruction 110 is positioned between the third beam splitter 105 and the fourth beam splitter 107 to ensure that any splits in the path 37 that are not directed to the appropriate lens are blocked. In one embodiment, each beam splitter of the one or more beam splitters is a non-polarizing beam splitter which does not affect the polarization direction of the input radiation.

A controller 40 may be configured to control the modulation of the input radiation at each area of the modulator surface. The controller 40 may load an image comprising one or more phase patterns onto the modulator surface. The image provides pixel by pixel phase modulation information that enables the vectorial optical field generator 5 to generate an output radiation with a complex vectorial optical field. The controller 40 may be coupled to the modulator surface by one or more wires, co-axial cable, LAN cable, optical coupling such as fiber optics, and wireless coupling which includes, but is not limited to, wireless protocols and associated equipment such as Bluetooth, Zigbee, Z-Wave, WiFi, Long Term Evolution (LTE), 60 GHz protocols such as Wireless HD and WiGig, radio (e.g., ultrawideband), cellular, satellite, and other IEEE 802 series wireless standards, and the like. For example, FIG. 1 illustrates a coupling means 43 between the controller 40 and the first light modulator 11 and the second light modulator 15.

Referring to FIG. 5, another embodiment is shown of a vectorial optical field generator 5' which includes a modulator surface 10, a first quarter wave plate 20, a second quarter wave plate 25, and an output plane 30. A radiation source 35 emits an input radiation along a path 37. The modulator surface 10 is positioned along the path 37 and is configured to modulate a phase of the input radiation on a first area 12 of the modulator surface 10, an amplitude of the input radiation on a second area 14 of the modulator surface 10, a polarization ratio of the input radiation on a third area 16 of the modulator surface 10, and a retardation of the input radiation along a fourth area 18 of the modulator surface 10. The first quarter wave plate 20 is positioned along the path 37 such that the input radiation travels through the first quarter wave plate 20, reflects off of the second area 14 of the modulator surface 10 and back through the first quarter wave plate 20. The second quarter wave plate 25 is positioned along the path 37 such that the input radiation travels through the second quarter wave plate 25, reflects off of the third area 16 of the modulator surface 10, and back through the second quarter wave plate 25. The output plane 30 is positioned along the path 37 and receives output radiation resulting from modulating the input radiation with the modulator surface 10, the first quarter wave plate 20, and the second quarter wave plate 25. FIG. 5 illustrates the path 37 as broken however it should be understood that the path 37 is continuous and the illustrated segments of the path 37 are joined at A-A, B-B, and C-C.

Referring to FIGS. 1 and 5, in one embodiment, the first area 12, second area 14, the third area 16, and the fourth area 18 may be about equal areas of the surface of each their respective light modulators. In one non-limiting example, the first area 12, second area 14, the third area 16, and the fourth area 18 may be arranged such that each occupies a position near each corner of a square or rectangular shaped modulator surface. In another non-limiting example where an area occupies a modulator surface with another area, the first area 12, second area 14, the third area 16, and the fourth area 18 may be positioned anywhere on the modulator surface such that each area does not interfere with an adjacenet area.

The general function of the components of the vectorial optical field generator 5 shown in FIG. 1 and the vectorial optical field generator 5' shown in FIG. 5 will now be discussed below. In general four LC-SLMs are needed in order to fully control all of the degree of freedoms to create a complex optical field. Taking advantage of the high definition TV format of the Holoeye HEO 1080P LC-SLM, two LC-SLM panels may be used with each of the LC-SLM panel divided into two halves to realize full control over all of the degrees of freedom to create a complex optical field. Alternatively, as discussed above, a single modulator surface may be used or 4 individual light modulators may be used such as that found in FIG. 5. Referring to FIG. 5, the modulator surface may be a high definition LC-SLM with enough surface area to accommodate the first area 12, the second area 14, the third area 16, and the fourth area 18 described above. Referring back the embodiment shown in FIG. 1, each half of each LC-SLM panel (i.e., the first light modulator 11 and the second light modulator 15) may be used to control one degree of freedom. This architecture utilizes the high resolution of the LC-SLM panel while the complexity of the vectorial optical field generator setup is kept manageable.

The polarizer 95 and the half-wave plate 97 may be used in combination to adjust Gaussian beam intensity of the input radiation radiated by the radiation source 35 along the path 37. One or more beam splitters (i.e., the first beam splitter 100, the second beam splitter 103, the third beam splitter 105, and the fourth beam splitter 107) may be used to properly direct the input radiation. Non-polarizing beam splitters may be used due to their insensitivity of the polarization direction of the input radiation. The input radiation first incidents on the first area 12 where phase modulation of the input radiation can be directly obtained. The first lens 53 and the first mirror 55 may be used as a 4-f system described above as a non-limiting example. The optical field at the LC-SLM surface in the first area 12 may be relayed to the second area 14 by carefully controlling the distances from the first light modulator 11 to the first lens 53 and from the first lens 53 to the first mirror 55 to be both equal to the focal length of the first lens 53. In one non-limiting example, the focal length of the first lens 53 may be 300 mm. The first quarter wave plate 20 in combination with the second area 14 works as a first polarization rotator 21' as described above. Amplitude modulation may be achieved in the second area 14 by using the first polarization rotator 21' and a polarizer 95 while the input radiation is still polarized horizontally.

The second image relay 60 includes the second lens 63 and the third lens 65 and may be used to relay the optical field between light modulators. By way of example, and not by limitation, if a single modulator surface is used, the second image relay 60 is not needed. The polarization rotation of the input radiation is obtained with the second polarization rotator 21". The fourth lens 73 and the second mirror 75 of the third image relay 70 work to relay the input radiation between the third area 16 and the fourth area 18. The distance between the second light modulator 15, the fourth lens 73 and the second mirror 75 may be adjusted as described above in relation to the first image relay 50. Retardation may be added to the optical field of the input radiation after being reflected from the fourth area 18. Finally, the fifth lens 83 and the sixth lens 85 of the fourth image relay 80 may be used to relay the input radiation from the fourth area 18 to the output plane 30.

The controller 40 may generate a control signal which includes the image. The image may include the overall phase pattern required by each area of the modulator surface to generate complex optical fields. The image may have a resolution which matches the resolution of the modulator surface. For example, if the modulator surface (e.g., the first light modulator 11 and the second light modulator 15) is a high definition (HD) reflective, phase-only, liquid crystal spatial light modulator, the control signal may have a resolution of 1920×1080. Although the controller 40 should have the capacity to generate a control signal within a range of resolutions which include the resolution of the modulator surface, it is not required.

The image may be multiplexed to provide simultaneous and instantaneous control over the four areas of the modulator surface. For example, the controller 40 may generate the control signal through a color channel coding scheme. The color channel coding scheme multiplexes the image to generate one or more phase patterns. For example, a first phase pattern for the first light modulator 11 is coded into the green color channel while a second phase pattern for the second light modulator 15 is coded in the red color channel. Each phase pattern on the each color channel may be further multiplexed spatially to two halves, one for each area of the area of each light modulator. It should be noted that the colors red and green are chosen for their use as a label in industry and are not indicative of frequencies of the visible spectrum that are used in either channel.

In one embodiment, as shown in FIG. 1, the controller 40 may be coupled to a driver circuit 45 to provide simultaneous and instantaneous control over both the first light modulator 11 and the second light modulator 15. The first phase pattern comprises a phase reflection corresponding to the first area 12 and an amplitude reflection corresponding to the second area 14. The second phase pattern comprises a polarization reflection corresponding to the third area 16 and a retardation reflection corresponding to the fourth area 18.

The controller 40 loads the first phase pattern onto the first light modulator 11 and the second phase pattern onto the second light modulator 15.

To generate complex beams, diffraction effects have to be taken into consideration. The diffraction should be minimized so that sharp edges or high frequency information in phase, amplitude, and polarization can persist through the vectorial optical field generator 5. One or more filters may be used to minimize diffraction. For example, a first spatial filter 90 and a second spatial filter 93 may be located in the Fourier planes of the one or more image relays and be used to suppress the interference caused by one or more beam splitters. Each image relay may be a 4-f imaging system which will also minimize the diffraction effects.

The one or more phase patterns of the image are calculated based on a collimated Gaussian input beam. Once calculated, the control signal from the controller 40 is loaded onto the vectorial optical field generator 5 and the modulation of the phase, the amplitude, the polarization ratio, and the retardation are realized through each area of the modulator surface. At the output plane 30, the output beam has the desired complex optical field distribution and can be analyzed thereafter.

Details of the modulations and phase pattern calculations will now be described with reference to FIG. 1. It should be understood that the description below is also applicable to the vectorial optical field generator 5' shown in FIG. 5. Phase modulation of the optical field of the input radiation can be realized as the phase information loaded on the first area 12 is directly imposed onto the horizontal component of the input radiation that is reflected from the first area 12. The optical field of the input radiation that is reflected from the first area 12 is a horizontally polarized, well-collimated Gaussian input beam. The reflected optical field from the first area 12 can be represented in terms of Jones Vector as:

$$J_1(x, y) = e^{j\phi_1(x,y)} E_0(x, y) \begin{pmatrix} 1 \\ 0 \end{pmatrix}, \quad (3)$$

where $E_o(x, y)$ is the amplitude of the input optical field and $\phi_1(x, y)$ is the phase pattern loaded onto the first area 12. As will be discussed later, the phase $\phi_1(x, y)$ will contain not only the desired phase $\phi_d(x, y)$ according to Equation (1), but also a pre-compensation phase that are due to the geometric phase effect for the polarization rotator 21 described above.

Amplitude modulation is achieved by putting a polarizer 95 with polarization axis oriented along horizontal direction after the first polarization rotator 21' utilizing the second area 14. For horizontally polarized input radiation optical field defined in Equation (3), the resulting reflected optical field from the second area 14 can be represented in Jones Vector format as:

$$J_2(x, y) = e^{j\left(\phi_1(x,y) + \frac{\phi_2(x,y)}{2} + \pi\right)} \sin\left(\frac{\phi_2(x, y)}{2}\right) E_0(x, y) \begin{pmatrix} 1 \\ 0 \end{pmatrix}, \quad (4)$$

where $\phi_2(x, y)$ is the phase pattern for the second area. Equation (4) shows that amplitude modulation can be achieved with the sine function while the reflected optical field from the second area 14 is still horizontally polarized. For $\phi_2=0$, 0, amplitude can be obtained. Unit amplitude is expected for $\phi_2=\pi$. The general expression for a complex desired field as shown in Equation (1), compared to the definition for the desired field, $\phi_2(x, y)$ can be calculated via the following expression:

$$\phi_2(x,y) = 2\sin^{-1}(A_d(x,y)). \quad (5)$$

As described in Equation (4), the output field of the second area 14 is horizontally polarized. Using the second polarization rotator 21" consisting of the third area 16, the state of polarization at each pixel can be linearly rotated to any direction prescribed by the phase pattern loaded onto the third area 16 to realize the desired polarization ratio distribution between the x- and y-polarization components. Assuming the phase pattern for third area 16 is $\phi_3(x, y)$, the reflected input radiation optical field of third area 16 is given by:

$$J_3(x, y) = \quad (6)$$
$$E_0(x, y) e^{j\left(\phi_1(x,y) + \frac{\phi_2(x,y)}{2} + \frac{\phi_3(x,y)}{2} + \pi\right)} \cdot \sin\left(\frac{\phi_2(x, y)}{2}\right) \begin{pmatrix} \cos\left(\frac{\phi_3(x, y)}{2} + \frac{\pi}{2}\right) \\ \sin\left(\frac{\phi_3(x, y)}{2} + \frac{\pi}{2}\right) \end{pmatrix}.$$

Similarly, $\phi_3(x, y)$ can be found from the desired field distribution given by Equation (1) as:

$$\phi_3(x, y) = 2\tan^{-1}\left(\frac{|E_{yd}(x, y)|}{|E_{xd}(x, y)|}\right) - \pi. \quad (7)$$

Phase retardation can be introduced by directly shining the linearly polarized reflected input radiation optical field from the third area 16 as shown in Equation (6) to the fourth area 18 due to the birefringence nature of the LC molecules. Assuming the phase pattern loaded onto the fourth area 18 is $\phi_4(x, y)$, the reflected input radiation from the fourth area 18, or the output radiation of the vectorial optical field generator 5, can be written as:

$$J_4(x, y) = E_0(x, y) e^{j\left(\phi_1(x,y) + \frac{\phi_2(x,y)}{2} + \frac{\phi_3(x,y)}{2} + \pi\right)} \cdot \quad (8)$$
$$\sin\left(\frac{\phi_2(x, y)}{2}\right) \begin{pmatrix} \cos\left(\frac{\phi_3(x, y)}{2} + \frac{\pi}{2}\right) e^{j\phi_4(x,y)} \\ \sin\left(\frac{\phi_3(x, y)}{2} + \frac{\pi}{2}\right) \end{pmatrix},$$

where:

$$\phi_4(x, y) = -\delta_d(x, y) \quad (9)$$

as given by the desired field distribution in Equation (1).

As described above, the first area 12 is responsible for the phase modulation. As is shown in Equation (8), the phase of the output radiation will have the following expression:

$$\phi_{output}(x, y) = \phi_1(x, y) + \frac{\phi_2(x, y)}{2} + \frac{\phi_3(x, y)}{2} + \pi. \quad (10)$$

Additional phases are acquired throughout the steps of amplitude and polarization ratio modulations due to the geometrical phase effects arising from the two polarization rotators 21 used in the vectorial optical field generator 5. Therefore, to correctly generate the desired phase in the output radiation, $\phi_1(x, y)$ must contain both the desired phase information $\phi_d(x, y)$ and a pre-compensation phase that compensates the accumulated geometrical phases. By equating $\phi_{output}(x, y)$ to $\phi_d(x, y)$, we have:

$$\phi_1(x,y)=\phi_d(x,y)+\phi_c(x,y), \quad (11)$$

where the pre-compensation phase is $\phi_c(x,y)=-\phi_2(x,y)/2-\phi_3(x,y)/2-\pi$. The need for this phase pre-compensation will be described in greater detail below.

For any desired output radiation optical field with complex spatial distributions of phase, amplitude and polarization, Equations (5), (7), (9), and (11) can be used to calculate the required phase patterns. By loading the phase patterns onto each area of the modulator surface, complex desired output field can be generated.

In order that the embodiments disclosed herein may be more readily understood, reference is made to the following examples which are intended to illustrate the embodiments described herein, but not limit the scope thereof.

Systems described herein demonstrate spatially variant phase-modulation capability with the generation of optical vortex beams. It should be noted that the term "beam" refers to radiation along the path 37 which may be either the input radiation and/or the output radiation depending on how the term "beam" is used. Optical vortices with spiral wavefront carry orbital angular momentum (OAM). If the phase of the beam has an azimuthal dependence of exp(jlφ), where φ is the azimuthal angle, then the phase is said to have an OAM of $l\hbar$ or a topological charge of 1. A vortex beam with topological charge 1 in the far field will have Laguerre Gaussian distribution of $LG_{01}$. Here only the first area 12 is controlled with a spiral phase and the phase patterns for the rest of the modulator surface remain flat. The generated field is focused by a lens (not shown) and the intensity is recorded at the focal plane of the lens. Vortex beams with topological charges 1, 10, and 15 are generated and the far field intensities are shown in FIGS. 6A, 6B, and 6C. For a phase term, $e^{jl\phi}$, φ is the azimuthal angle of a cylindrical coordinates, l is and integer number and represents the topological charge of this phase. 1, 10 and 15 are just different values of the topical charge. The lens is positioned after the input radiation is reflected off of the first area 12 and is used solely to capture the images of FIGS. 6A, 6B, and 6C which demonstrate the phase modulation of the input radiation on the first area 12. It should be understood that to demonstrate the phase modulation of the vectorial optical field generator 5, the other areas of the modulation surfaces are loaded with a flat phases.

As shown in FIGS. 6A, 6B, and 6C, $LG_{0,1}$, $LG_{0,10}$ and $LG_{0,15}$ are observed in the focal plane of the lens. As the topological charge increases, the size of the dark center also increases. A weak central spot is also observed, which may be caused by the direct reflection due to the filling factor, finite pixel size and level of quantization of the modulator surface. The relative amplitude of the central spot is more pronounced for higher topological charges due to the enlarged ring area.

Referring now to FIG. 7, to demonstrate the functionality of spatially variant amplitude modulation, an "EO" logo binary amplitude pattern was created. The second area 14 was loaded with an "EO" shaped π-phase pattern for 100% transmission and zero for the rest of the window. Window is defined as the area of the modulator surface that is used to control the vectorial optical field. It should be understood that the full window (i.e., area of the modulator surface) does not need to be used to realize full control over complex vectorial optical fields. The first area 12 was loaded with a pre-compensation phase and the third area 16 and the fourth area 18 both had a flat phase loaded onto them. The output, directly captured at the output plane 30 (e.g., CCD camera), is shown in FIG. 7. It is believed that the entire window would have been illuminated by the input Gaussian beam (i.e., input radiation) without the amplitude modulation. This is because the input Gausssina beam size is large enough to fill the entire window and without the amplitude modulation scheme, essentially an observer will see the intensity distribution of the input itself at the output plane 30. The result shows that fine features such as sharp edges in amplitude modulation (i.e., the second area 14) are well preserved in the output radiation of the vectorial optical field generator 5 captured at the output plane 30.

Figure 8A:
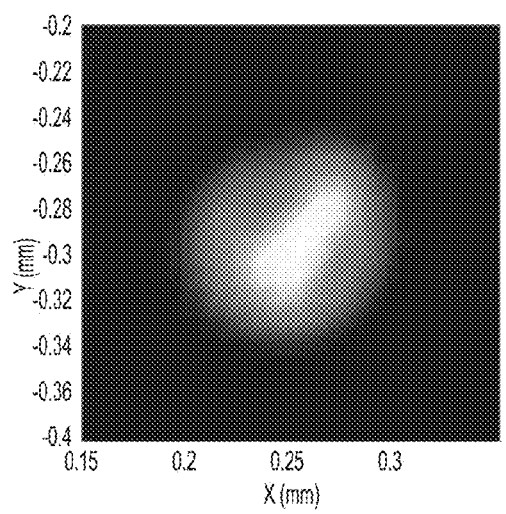
FIG. 8A is an image of a radially polarized beam without pre-compensation phase generated by the vectorial optical field generator system according to one or more embodiments shown and described herein.
Figure 8B:
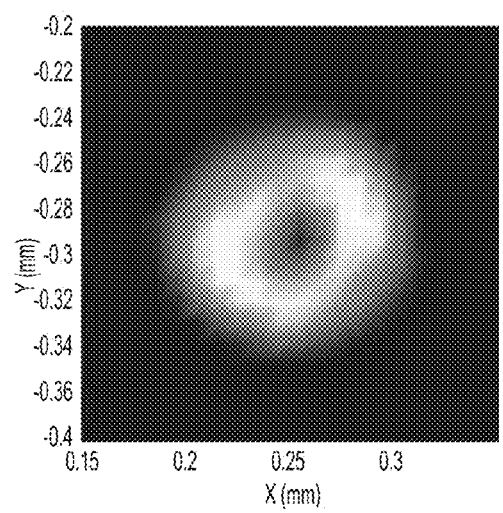
FIG. 8B is an image of a radially polarized beam with pre-compensation phase generated by the vectorial optical field generator system according to one or more embodiments shown and described herein.

Referring to FIGS. 8A and 8B, cylindrical vector (CV) beams are a group of beams whose spatially variant state of polarization possesses cylindrical symmetry with unique properties when focused by a high numerical aperture (NA) objective. A radially polarized beam is one subset of CV beams. The CV beams such as the radially polarized beam can be generated with the polarization rotation function of the third area 16. Horizontally polarized input radiation can be locally rotated pixel-by-pixel to the desired polarization direction. However, as described with respect to Equation (2), the spatially variant polarization rotation introduces an additional geometric phase. This additional phase may be pre-compensated by the phase pattern for the first area 12, as shown in Equation (11).

When a radially polarized beam is focused by low NA lens, a doughnut distribution may result in the focal plane, owing to the polarization singularity at the center. To generate a radially polarized beam, the phase pattern for the third area 16 $\phi_3$ will have an azimuthal dependence of 2φ according to Equation (7), where φ is the azimuth angle. Based on Equation (8), the extra phase introduced by the third area 16 will carry a phase with azimuthal dependence of φ, that is, a spiral phase with topological charge l=1. To generate true radial polarization with a flat phase, a spiral phase with topological charge l=−1 should be incorporated in the pre-compensation phase by the phase pattern for the first area 12. To verify the phase pre-compensation, radially polarized beams may be generated without and with the pre-compensation phase. The far field intensities are captured at the focal plane of a lens, as shown in FIGS. 8A and 8B.

As shown in FIG. 8A, without pre-compensation, a bright spot is obtained when such beam is focused. This can be understood as the additional spiral phase cancelled the polarization singularity at the center of the focused radially polarized beam. Once the pre-compensation phase is introduced, a doughnut distribution is obtained and shown in FIG. 8B. This confirms that the geometrical phase generated due to the operation of the third area 16 is successfully compensated. In general, the phase pre-compensation scheme can be used to compensate any additional phases that are introduced in the following modulation steps from the second area 14, the third area 16, and the fourth area 18, as shown in Equation (11). Moreover, this confirmation of the phase pre-compensation also serves as another evidence of the phase modulation capability of the vectorial optical field generator 5, which will be described below.

Figure 9:
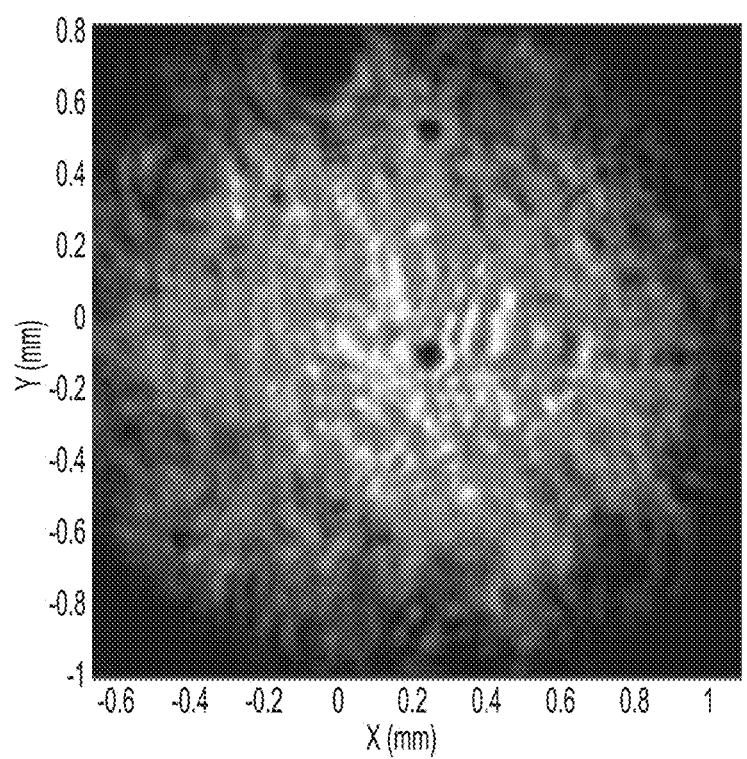
FIG. 9 is an image of the total field of a radially polarized beam generated by the vectorial optical field generator system according to one or more embodiments shown and described herein.
Figure 10:
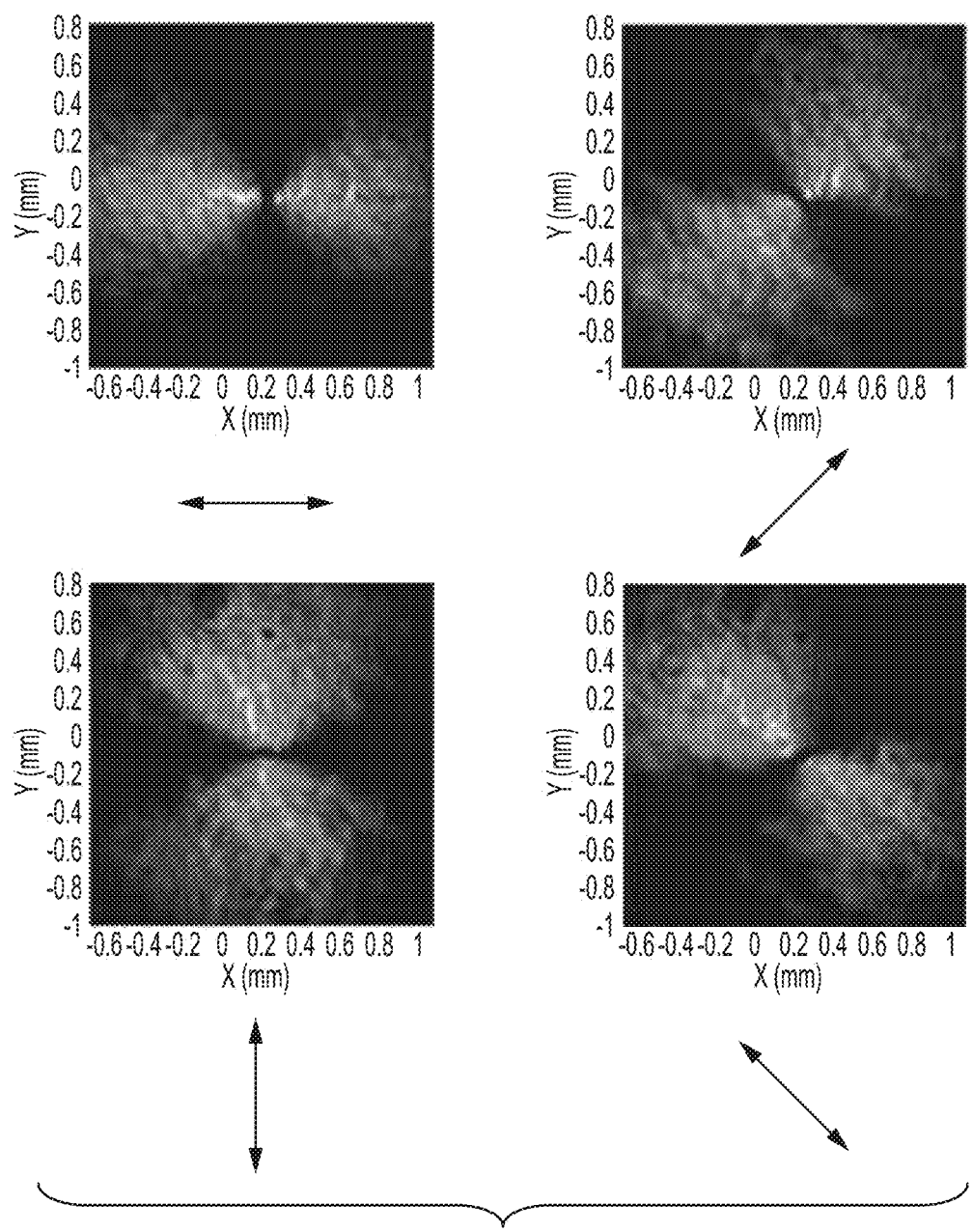
FIG. 10 is a series of images of the optical field of the total field in FIG. 9 after a polarizer with the transmission axis orientation of the polarizer indicated by black arrows at 0°, 45°, 90° and 135°, respectively according to one or more embodiments shown and described herein.
Figure 11:
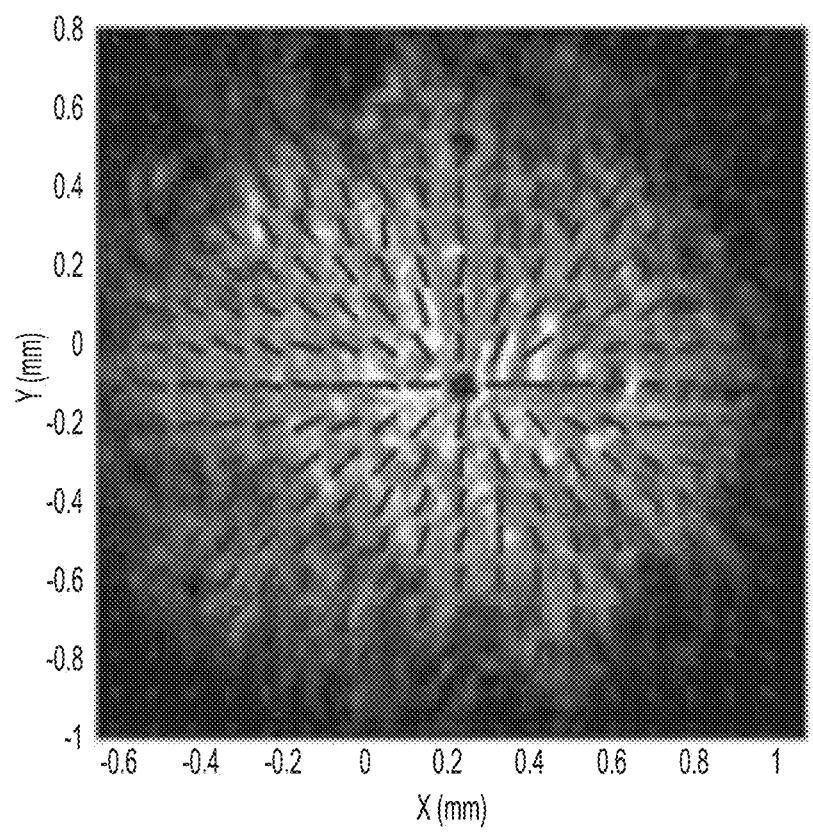
FIG. 11 is an image of the intensity distribution of radially polarized beam generated by the vectorial optical field generator system superimposed with the polarization map according to one or more embodiments shown and described herein.

The generated radially polarized beam is shown in FIG. 9. FIG. 10 illustrates the radially polarized beam shown in FIG. 9 but with arrows indicating the direction of the linear analyzer in front of the output plane 30 (FIG. 1) and the intensity of each linear polarization component. The polarization map is given in FIG. 11, which is calculated based on partial Stokes parameter measurement of S0, S1 and S2. The orientation of the lines indicates the local polarization direction while the length of lines indicates the local intensity. As shown in FIG. 11, radial polarization in the output field is observed and the spatially variant polarization rotation capability is demonstrated.

Figure 12A:
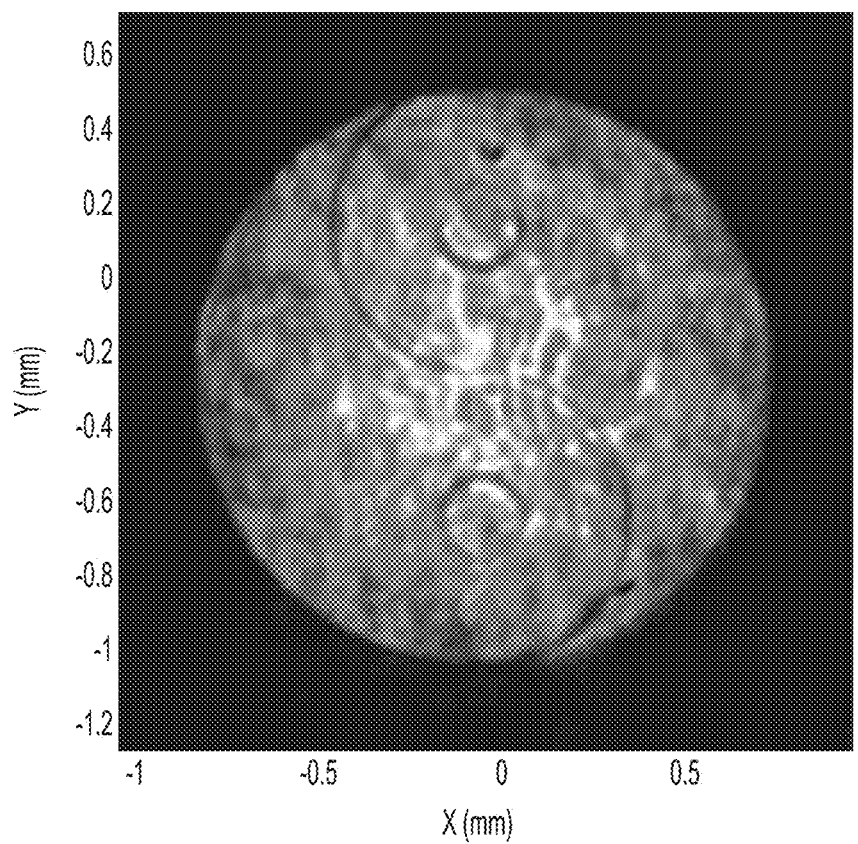
FIG. 12A is an image of a Taiji pattern coded in circular polarization generated by the vectorial optical field generator system according to one or more embodiments shown and described herein.
Figure 12B:
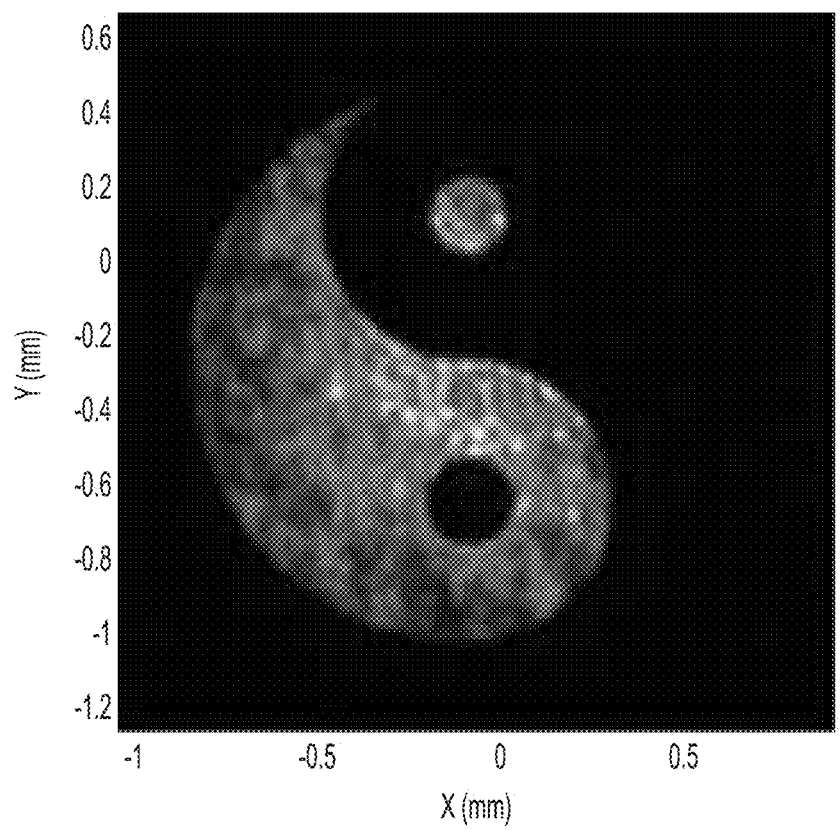
FIG. 12B is an image of the upper half Taiji pattern in right-hand circular polarization generated by the vectorial optical field generator system according to one or more embodiments shown and described herein.
Figure 12C:
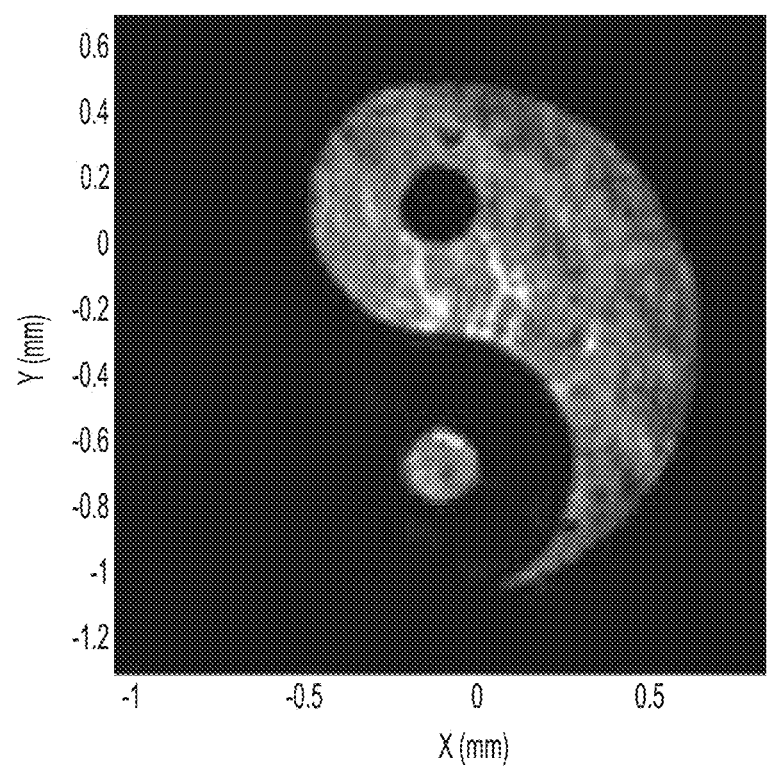
FIG. 12C is an image of the lower half Taiji pattern in left-hand circular polarization generated by the vectorial optical field generator system according to one or more embodiments shown and described herein.

Referring now to FIGS. 12A, 12B, and 12C, right-hand circular polarization (RCP) and left-hand circular polarization (LCP) have phase retardations of $+\pi/2$ and $-\pi/2$, respectively. To demonstrate the capability of the vectorial optical field generator 5 (FIG. 1) with spatially variant phase retardation, a Taiji pattern was generated with one half polarized in right-hand circular polarization (FIG. 12B) and the other half in left-hand circular polarization (FIG. 12C). The total field is shown in FIG. 12A. Circular analyzers including a QWP and a linear polarizer were used, where the angle between the fast axis of the QWP and the transmission axis of the polarizer was set at $+\pi/4$ and $-\pi/4$ to examine the RCP and LCP, respectively.

Figure 13A:
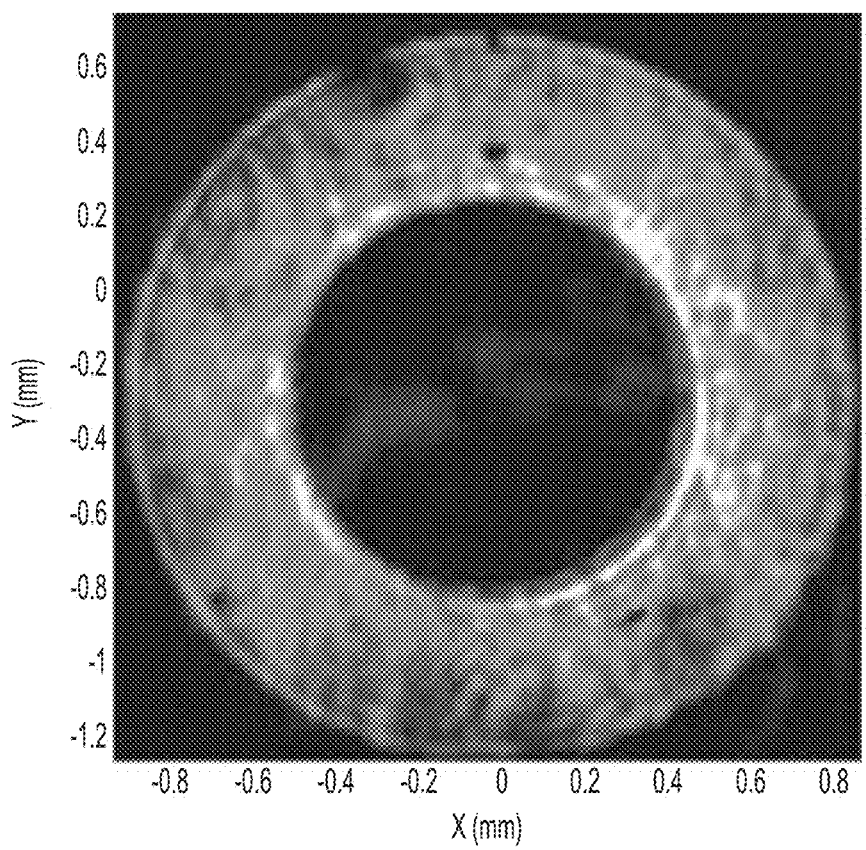
FIG. 13A is an image of a ring structure generated by the vectorial optical field generator system according to one or more embodiments shown and described herein.
Figure 13B:
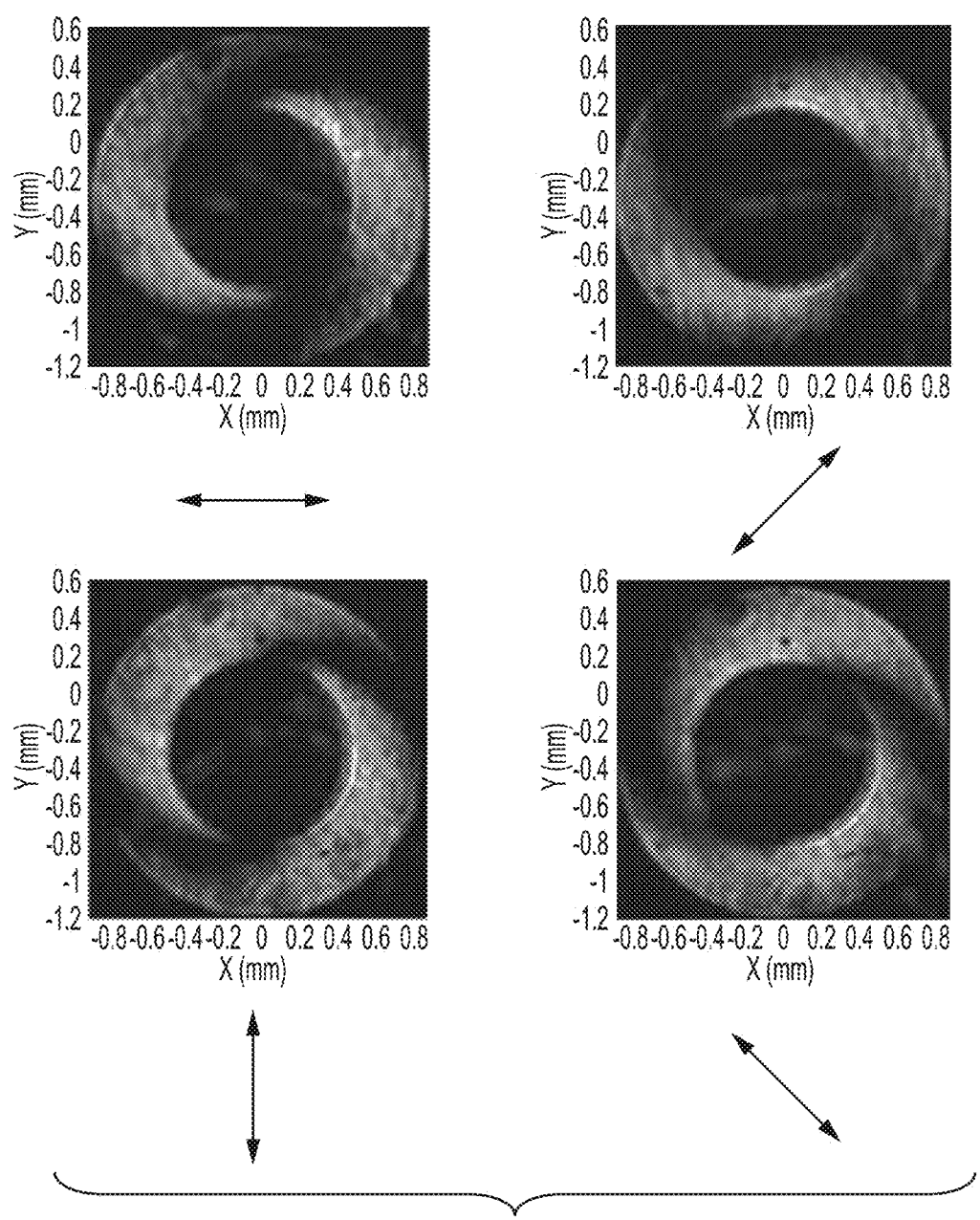
FIG. 13B is a series of images with the state of polarization continuously varying from azimuthal to radial direction as radius increases as indicated by the arrows, the various states of polarization are generated by the vectorial optical field generator system according to one or more embodiments shown and described herein.
Figure 13C:
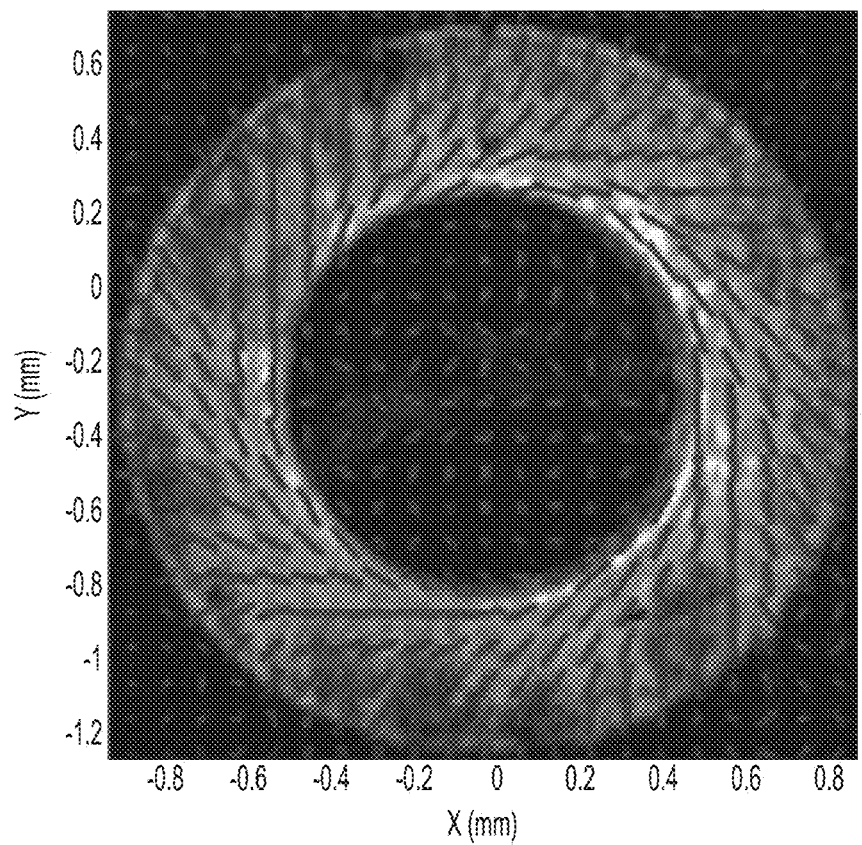
FIG. 13C is an image of the intensity distribution of the ring structure generated by the vectorial optical field generator system superimposed with the polarization map according to one or more embodiments shown and described herein.

FIGS. 13A, 13B, and 13C illustrates one example of the generation of a complex vectorial optical field with multiple parameters. The total field is shown in FIG. 13A, the filed distribution after polarizer at 0°, 45°, 90° and 135° is shown in FIG. 13B where the polarization axes are indicated by the arrows, and the local state of polarization map is shown in FIG. 13C. The generation of complex optical fields requires control of multiple parameters. To demonstrate those multiple parameters, a ring-shaped optical field with the local state of polarization continuously varying from azimuthal to radial direction as the radius increases is shown in FIGS. 13A, 13B, and 13C. These illustrations show the gradual change from azimuthal to radial for local state of polarization. The multiple parameters may include phase, amplitude, and polarization orientation are controlled simultaneously by the vectorial optical field generator 5.

Figure 14A:
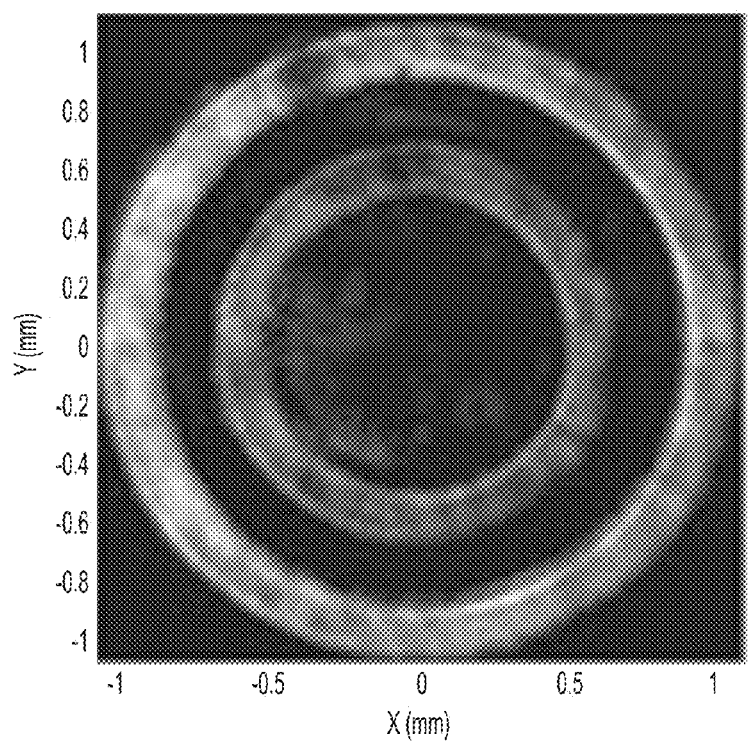
FIG. 14A is an image of the total field of a double ring pattern generated by the vectorial optical field generator system according to one or more embodiments shown and described herein.
Figure 14B:
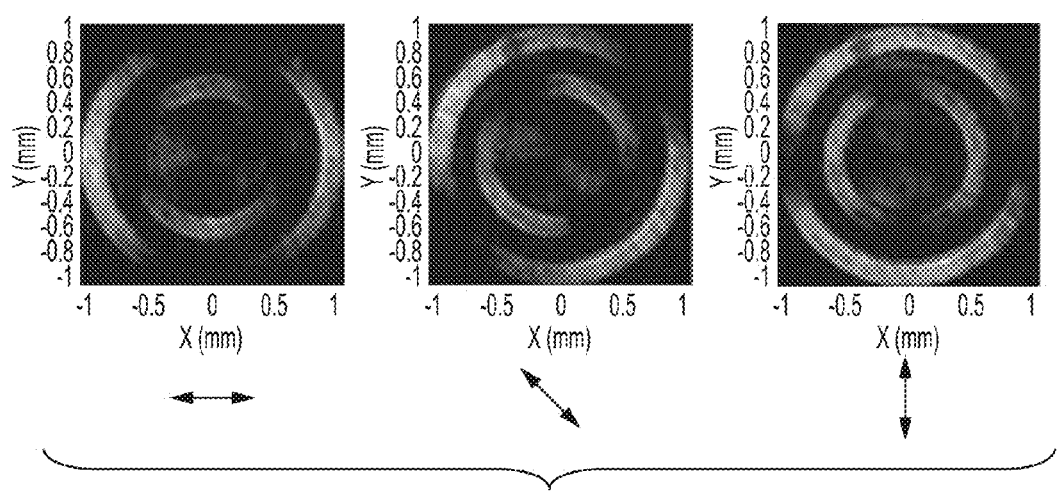
FIG. 14B is a series of images with the linear polarization components of the double ring pattern shown in with various polarization axis generated by the vectorial optical field generator system and indicated by the arrows according to one or more embodiments shown and described herein.
Figure 14C:
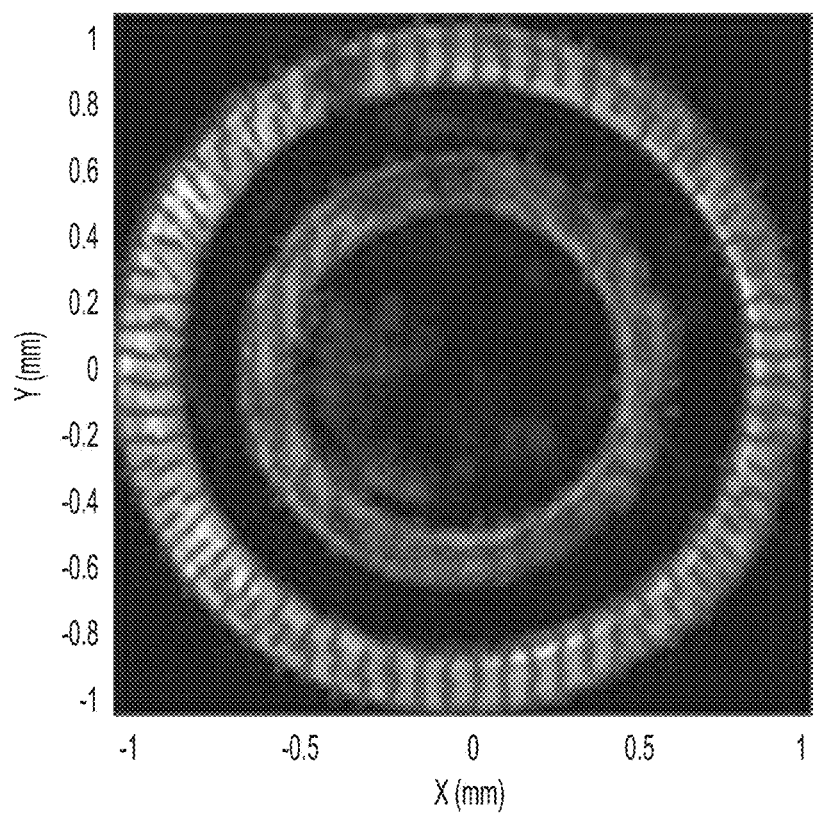
FIG. 14C is an image of the intensity distribution of the ring structure generated by the vectorial optical field generator system superimposed with the polarization map according to one or more embodiments shown and described herein.

Referring to FIGS. 14A, 14B, and 14C, in a further example, a double ring pattern was generated in which the inner ring was azimuthally polarized with 0.5 relative amplitude while the outer ring is radially polarized with unit relative amplitude. The total field is shown in FIG. 14A, the linear polarization components are shown in FIG. 14B, where the polarization axes are indicated by the arrows, and the polarization map is given in FIG. 14C. As shown in the illustrations, the outer ring has a higher intensity than the inner one as opposed to the fundamental Gaussian distribution and the polarization distribution follows the design. The term "polarization map" may be understood as the measurement of the polarization distribution across the output radiation. In FIGS. 14A, 14B, and 14C, the outer ring has a higher intensity due to the design of the polarization map.

Figure 15A:
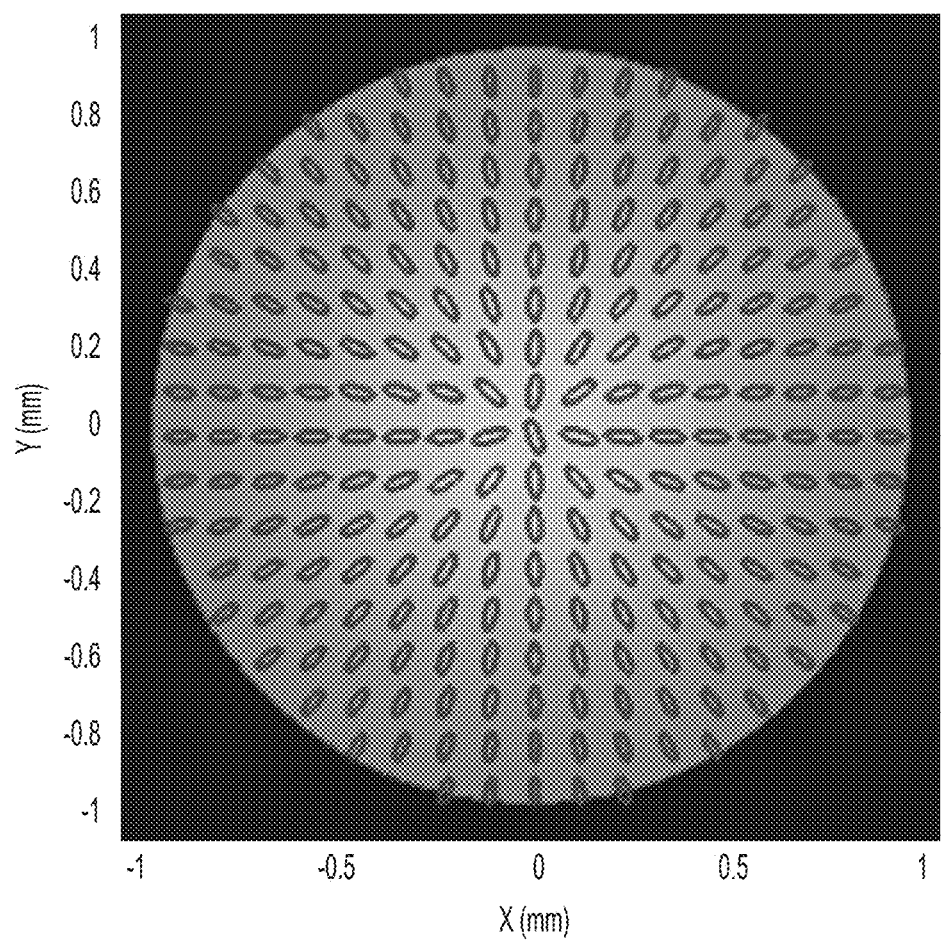
FIG. 15A is a simulated image of an optical field with constant ellipticity and elevation angle along radial direction superimposed with the polarization map according to one or more embodiments shown and described herein.
Figure 15B:
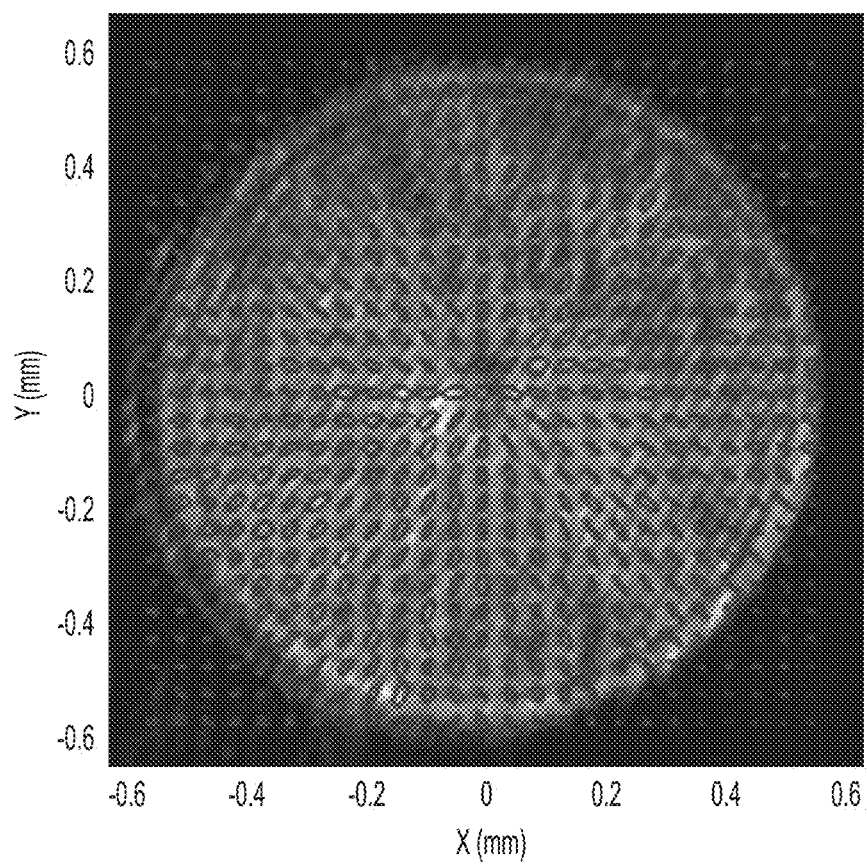
FIG. 15B is an image of an optical field with constant ellipticity and elevation angle along radial direction generated by the vectorial optical field generator system superimposed with the polarization map according to one or more embodiments shown and described herein.
Figure 15C:
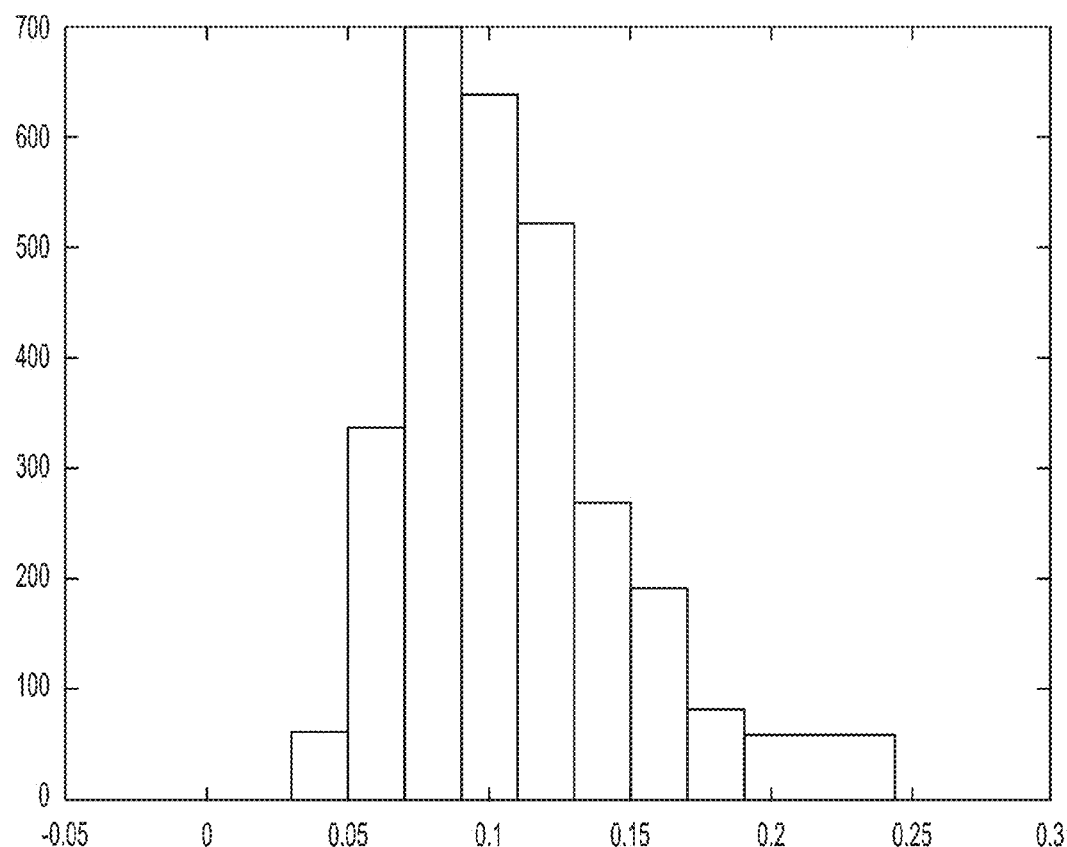
FIG. 15C is a histogram of ellipticity of the optical field generated by the vectorial optical field generator system according to one or more embodiments shown and described herein.

Referring to FIGS. 15A, 15B, and 15C, in a further example, complex vectorial optical field with local polarization elevation angle along radial direction and constant ellipticity of $\pi/10$ was designed. In other words, the state of polarization at each location is elliptical with constant ellipticity and the major axis of the ellipse was always along the radial direction. FIG. 15A is a simulated image of the ideal field distribution with polarization map. FIG. 15B is an image of the optical field generated by the vectorial optical field generator superimposed on a polarization map and FIG. 15C is a histogram of the ellipticity (in unit of $\pi$ radian) experimentally generated.

As demonstrated in FIGS. 15A, 15B, and 15C, the full Stokes parameter measurement of S0, S1, S2 and S3 may be performed to reveal the spatial distribution of the state of polarization of the generated beam. The histogram of the ellipticity peaks around $0.1\pi$, which shows the generation of the designed ellipticity. At some points the local state of polarization is slightly different from the expected. This may be due to the fact that the interference patterns caused by the LC-SLM surface can significantly change the state of polarization and any vibration introduced into the system which also affects the accuracy of the full Stokes parameters measurement. Vibration may be introduced through the experimental set-up such as the optical table, optical device mounts, etc.

Thus, systems according to embodiments described above may include a versatile vectorial optical field generator capable of generating complex optical fields by spatially modulating all aspects of optical field (including phase, amplitude, polarization ratio and retardation) on a pixel-by-pixel basis and in any order. Various complex vector fields have been generated and tested to demonstrate the functionality and flexibility of the proposed vectorial optical field generator. This complex optical field generator may find extensive applications in areas where exotic input fields are required, such as optical imaging, sensing, particle manipulation. flat top beams, and beam shaping.

Unless otherwise defined, all technical and scientific terms used herein have the same meaning as commonly understood by one of ordinary skill in the art to which the claimed subject matter belongs. The terminology used in the description herein is for describing particular embodiments only and is not intended to be limiting. As used in the specification and appended claims, the singular forms "a," "an," and "the" are intended to include the plural forms as well, unless the context clearly indicates otherwise.

Certain terminology is used in the disclosure for convenience only and is not limiting. The words "left", "right", "front", "back", "upper", and "lower" designate directions in the drawings to which reference is made. The terminology includes the words noted above as well as derivatives thereof and words of similar import.

The controller 40 and/or the driver circuit 45 shown in FIG. 1 may have at least one processor and the computer-readable medium. A computer-usable or the computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, propagation medium, or other forms of non-transitory memory devices. For example, but not limited to, a non-transitory computer-readable medium may include: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present disclosure may be written in a high-level programming language, such as C or C++, for development convenience. In addition, computer program code for carrying out operations of the present disclosure may also be written in other programming languages, such as, but not limited to, interpreted languages. Some modules or routines may be written in assembly language or even micro-code to enhance performance and/or memory usage. However, software embodiments of the present disclosure do not depend on implementation with a particular programming language. It will be further appreciated that the functionality of any or all of the program modules may also be implemented using discrete hardware components, one or more application specific integrated circuits (ASICs), or a programmed digital signal processor or microcontroller.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vectorial optical field generator comprising a radiation source, a modulator surface, a first quarter wave plate, a second quarter wave plate, and an output plane, wherein:
    the radiation source emits an input radiation along a path;
    the modulator surface is positioned along the path and configured to modulate:
        a phase of the input radiation on a first area of the modulator surface,
        an amplitude of the input radiation on a second area of the modulator surface,
        a polarization ratio of the input radiation on a third area of the modulator surface, and
        a retardation of the input radiation along a fourth area of the modulator surface;
    the first quarter wave plate is positioned along the path such that the input radiation travels through the first quarter wave plate, reflects off of the second area of the modulator surface, and back through the first quarter wave plate;
    the second quarter wave plate is positioned along the path such that the input radiation travels through the second quarter wave plate, reflects off of the third area of the modulator surface, and back through the second quarter wave plate; and
    the output plane is positioned along the path and receives output radiation resulting from modulating the input radiation with the modulator surface, the first quarter wave plate, and the second quarter wave plate.

2. The vectorial optical field generator of claim 1, further comprising a controller configured to control the modulator surface wherein the controller loads an image comprising one or more phase patterns required to generate the output radiation with a complex vectorial optical field onto the modulator surface.

3. The vectorial optical field generator of claim 2, wherein:
    the modulator surface comprises a first light modulator and a second light modulator, wherein:
    the first light modulator comprises the first area and the second area; and
    the second light modulator comprises the third area and the fourth area.

4. The vectorial optical field generator of claim 3, wherein each light modulator is a reflective, phase-only, liquid crystal spatial light modulator.

5. The vectorial optical field generator of claim 3, wherein:
    the one or more phase patterns comprise a first phase pattern and a second phase pattern;
    the first phase pattern comprises a phase reflection corresponding to the first area and an amplitude reflection corresponding to the second area;
    the second phase pattern comprises a polarization ratio reflection corresponding to the third area and a retardation reflection corresponding to the fourth area;
    the controller loads the first phase pattern onto the first light modulator; and
    the controller loads the second phase pattern onto the second light modulator.

6. The vectorial optical field generator of claim 5, further comprising a first image relay, a second image relay, a third image relay, and a fourth image relay, wherein:
    the first image relay comprises a first lens and a first mirror;
    the first image relay is positioned along the path between the first area and the second area;
    the second image relay comprises a second lens and a third lens;
    the second image relay is positioned along the path between the second area and the third area;
    the third image relay comprises a fourth lens and a second mirror;
    the third image relay is positioned along the path between the third area and the fourth area; and
    the fourth image relay comprises a fifth lens and a sixth lens; and
    the fourth image relay is positioned along the path between the fourth area and the output plane.

7. The vectorial optical field generator of claim 6, further comprising a first spatial filter positioned along the path between the second lens and the third lens.

8. The vectorial optical field generator of claim 7, further comprising a second spatial filter positioned along the path between the fifth lens and the sixth lens.

9. The vectorial optical field generator of claim 6, wherein each image relay is a 4-f imaging system comprising at least one lens.

10. The vectorial optical field generator of claim 9, wherein each 4-f imaging system comprises one lens and a mirror.

11. The vectorial optical field generator of claim 1, wherein the radiation source is a coherent radiation source.

12. The vectorial optical field generator of claim 1, further comprising a polarizer and a half-wave plate positioned along the path between the radiation source and the modulator surface.

13. The vectorial optical field generator of claim 1, wherein the input radiation is visible light.

14. A method for generating complex vectorial optical field on a pixel by pixel basis, comprising:
    emitting an input radiation along a path;
    displaying an image on a modulator surface;
    positioning the modulator surface along the path;
    modulating:
        a phase of the input radiation on a first area of the modulator surface,
        an amplitude of the input radiation on a second area of the modulator surface,
        a polarization ratio of the input radiation on a third area of the modulator surface, and
        a retardation of the input radiation on a fourth area of the modulator surface;
    rotating a polarization axis of the input radiation with a first quarter wave plate positioned along the path such that the input radiation travels through the first quarter wave plate, reflects off of the second area, and back through the first quarter wave plate;

rotating the polarization axis of the input radiation with a second quarter wave plate positioned along the path such that the input radiation travels through the second quarter wave plate, reflects off of the third area, and travels back through the second quarter wave plate; and receiving an output radiation with a complex vectorial optical field on an output plane resulting from modulating the input radiation with the modulator surface, the first quarter wave plate, and the second quarter wave plate.

15. The method of claim 14, further comprising loading on the modulator surface the image with one or more phase patterns corresponding to the phase, the amplitude, the polarization ratio, and the retardation required to generate the output radiation with the complex vectorial optical field.

16. The method of claim 15, further comprising splitting the image into a first channel and a second channel wherein:
   the first channel comprises a first phase pattern of the one or more phase patterns;
   the first phase pattern comprises a phase reflection corresponding to the first area and an amplitude reflection corresponding to the second area;
   the second channel comprises a second phase pattern of the one or more phase patterns; and
   the second phase pattern comprises a polarization ratio reflection corresponding to the third area and a retardation reflection corresponding to the fourth area.

17. The method of claim 16 wherein the modulator surface comprises a first light modulator positioned along the path and a second light modulator positioned along the path, wherein:
   the first light modulator comprises the first area and the second area; and
   the second light modulator comprises the third area and the fourth area.

18. The method of claim 14, wherein the modulator surface is a reflective, phase-only, liquid crystal spatial light modulator.

19. The method of claim 14, further comprising compensating for an accumulation of geometrical phases in the first area that are acquired by the input radiation in the second area and the third area.

20. A vectorial optical field generation system comprising a radiation source, a first light modulator, a second light modulator, a first quarter wave plate, a second quarter wave plate, an output plane, and a controller; wherein:

the radiation source emits an input radiation along a path;
the first light modulator and the second light modulator are both reflective, phase-only, liquid crystal spatial light modulators;
the first light modulator positioned along the path comprises:
   a phase of the input radiation on a first area of the first light modulator, and
   an amplitude of the input radiation on a second area of the first light modulator;
the second light modulator positioned along the path comprises:
   a polarization ratio of the input radiation on a third area of the second light modulator, and
   a retardation of the input radiation along a fourth area of the second light modulator;
the first quarter wave plate positioned along the path such that the input radiation travels through the first quarter wave plate, reflects off of the second area of the first light modulator and back through the first quarter wave plate;
the second quarter wave plate positioned along the path such that the input radiation travels through the second quarter wave plate, reflects off of the third area of the second light modulator, and back through the second quarter wave plate;
the output plane is positioned along the path and receives output radiation resulting from modulating the input radiation with the first light modulator, the second light modulator, the first quarter wave plate, and the second quarter wave plate; and
the controller is configured to control the first light modulator and the second light modulator, wherein:
   the controller retrieves from memory an image comprising one or more phase patterns required to generate the output radiation with a complex vectorial optical field,
   the one or more phase patterns comprise a first phase pattern and a second phase pattern;
   the first phase pattern comprises a phase reflection corresponding to the first area and an amplitude reflection corresponding to the second area;
   the second phase pattern comprises a polarization ratio reflection corresponding to the third area and a retardation reflection corresponding to the fourth area;
   the controller loads the first phase pattern onto the first light modulator; and
   the controller loads the second phase pattern onto the second light modulator.

* * * * *